Dec. 6, 1949  H. AKED  2,490,397
REAMER
Filed June 6, 1946

Inventor
Harry Aked

Patented Dec. 6, 1949

2,490,397

UNITED STATES PATENT OFFICE 2,490,397

REAMER

Harry Aked, Bexley Heath, England, assignor to David Brown & Sons (Huddersfield), Limited, Huddersfield, England Application June 6, 1946, Serial No. 674,782
In Great Britain June 21, 1945

2 Claims. (Cl. 77—58)

The invention relates to reamers of the kind in which an assembly of two blades, with their cutting edges in diametrically opposed relation, is free to move within predetermined limits in the direction parallel to the common plane of the edges and perpendicular to the axis of the reamer, and in which the distance between the edges is simultaneously adjustable by mechanism that acts appropriately on the assembly of the blades. The invention has for its object to provide a reamer of this kind in which the machining operations required for its production are all of simple character.

The invention is characterised in that between two blades, slidably carried in a slot extending transversely through a bar or shank, there is disposed an axially adjustable block or adjusting member which engages in inclined grooves in the opposed abutting faces of the blades, the grooves being similar in angle but extending in opposite directions. Axial movement of the adjusting block thus causes the two blades to be moved simultaneously outwards or inwards through a similar distance. As an alternative, of course, the blades may have inclined ribs fitting into grooves in the adjusting block.

In the accompanying drawings.

Figure 1:
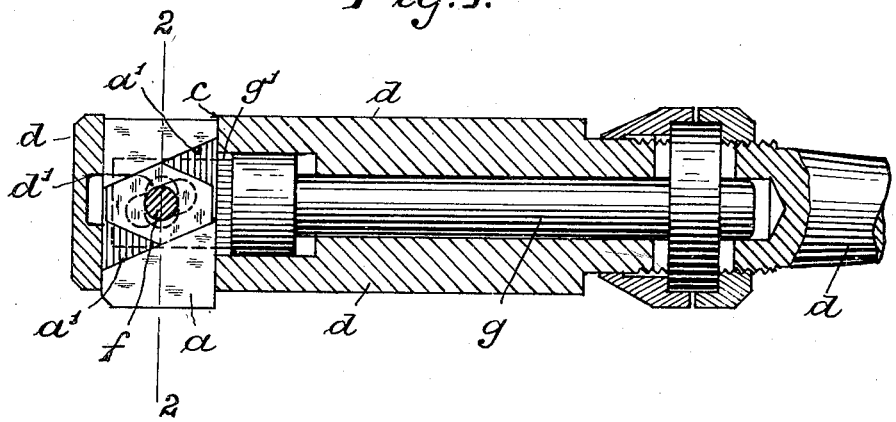
Fig. 1 shows a longitudinal section of a reamer according to the invention.
Figure 2:
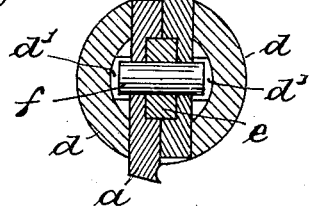
Fig. 2 is a cross section on the line 2—2 in Fig. 1.
Figure 3:
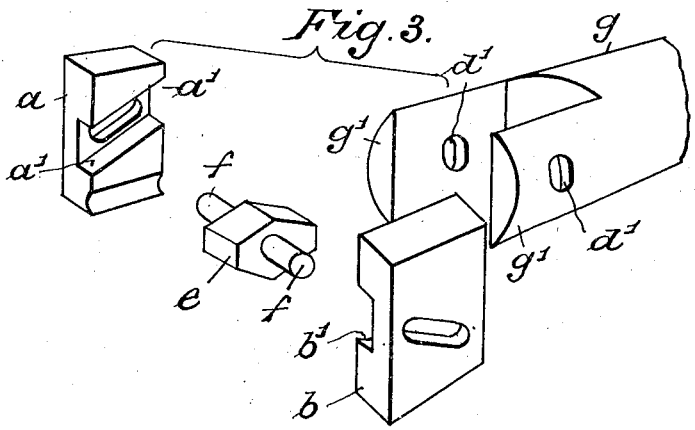
Fig. 3 shows in perspective the parts of the reamer in disassembled relation.

Referring to the drawings, the two blades $a$ and $b$ are slidably carried in a slot $c$ in a bar or shank $d$ set substantially coaxial with the work being reamed. The slot $c$ extends transversely through the bar in symmetrical relation to and perpendicular to the axis of the bar. The abutting faces of the blades contain the axis of the bar and are provided each with a parallel groove $a'$ or $b'$ inclined at an arbitrary angle, preferably of about 30° to the axis of the bar. The angles of the grooves are measured in opposite directions from the axis of the bar, so that the angle between the grooves on the abutting faces is about 60°. An adjusting plate or block $e$, situated between the blades, is in the form of or is provided with two tenons fitting one into each of the aforementioned grooves $a'$ and $b'$ in the blades.

The distance of the block from the end face of the bar is determined by the position of a transverse pin $f$ carried by the block and fitting into a hole or preferably slidably into a slot $d'$ in each of two jaws $g'$, $g'$, that embrace the blades and are formed as prolongations of a central rod $g$ co-axial with the bar. The slots $d'$, if provided, are so disposed as to permit the block $e$ and blades $a$ and $b$ to have freedom of movement or "float" perpendicular to the axis of the bar $d$ to an extent equal to the length of the slots less the diameter of the pin.

Movement of the block $e$ in a direction parallel to the axis of the bar $d$ causes the tenons formed by or on the block to slide in the grooves $a'$ and $b'$ in the blades and, owing to the angle between the grooves in the respective blades, to vary the separation of the cutting edges. The effective diameter of the reamer is thus adjustable within limits by appropriate longitudinal adjustment of the position of the aforementioned central rod $g$ that determines the longitudinal position of the transverse pin, and this may be effected by micrometer screw or other known means.

As an alternative to forming the block or plate, disposed between the cutting blades, with tenons to work in grooves in the respective blades, the latter may have suitable inclined tenons, ribs or projections to work in grooves in the block.

Having thus described my invention, what I claim as new and desire to secure by Letters Patent is:

1. An adjustable reamer comprising in combination a hollow shank; a transversal slot at the front end of said hollow shank; a pair of blade members arranged slidably in transversal direction in said transverse slot; an adjusting block member disposed between said blade members slidably in axial direction of said hollow shank; operating means connecting said blade members with said adjusting block member in such a manner that sliding of said adjusting block member in axial direction results in sliding of said blade members in transversal direction; a rod arranged slidably in axial direction within said hollow shank projecting at its front end into said transversal slot in said hollow shank and at its rear end beyond the rear end of said hollow shank; a pair of parallel jaw members on said rod at the front end thereof; a transversal elongated hole in each of said parallel jaw members; two oppositely arranged pins on said adjusting block member, each projecting into one of said transversal elongated holes so as to enable sliding of said adjusting block member by said rod; and means for moving said rear end of said rod in axial direction of said hollow shank so as to slide thereby said adjusting block member in axial direction resulting in movement of said blade members in transversal direction, 2. An adjustable reamer comprising in combination a hollow shank; a transversal slot at the front end of said hollow shank; a pair of blade members arranged slidably in transversal direction in said transverse slot; an adjusting block member disposed between said blade members slidably in axial direction of said hollow shank; operating means connecting said blade members with said adjusting block member in such a manner that sliding of said adjusting block member in axial direction results in sliding of said blade members in transversal direction; a rod arranged slidably in axial direction within said hollow shank projecting at its front end into said transversal slot; a pair of parallel jaw members on said rod at the front end thereof; a transversal elongated hole in each of said parallel jaw members; two oppositely arranged pins on said adjusting block member, each projecting into one of said transversal elongated holes so as to enable sliding of said adjusting block member by said rod; and means for sliding said rod in axial direction of said hollow shank so as to slide thereby said adjusting block member in axial direction resulting in movement of said blade members in transversal direction.

HARRY AKED.

REFERENCES CITED

The following references are of record in the file of this patent:

UNITED STATES PATENTS

| Number | Name | Date |
|---|---|---|
| 1,290,206 | Hawk | Jan. 7, 1919 |
| 2,090,718 | Young | Aug. 24, 1937 |